US007096722B2

(12) United States Patent
Benson et al.

(10) Patent No.: US 7,096,722 B2
(45) Date of Patent: Aug. 29, 2006

(54) METHOD AND APPARATUS FOR DETECTING COMBUSTION INSTABILITY IN CONTINUOUS COMBUSTION SYSTEMS

(75) Inventors: Kelly J. Benson, Fort Collins, CO (US); Jimmy D. Thornton, Morgantown, WV (US); George A. Richards, Morgantown, WV (US); Douglas L. Straub, Morgantown, WV (US)

(73) Assignee: Woodward Governor Company, Fort Collins, CO (US)

( * ) Notice: Subject to any disclaimer, the term of this patent is extended or adjusted under 35 U.S.C. 154(b) by 236 days.

(21) Appl. No.: 10/329,664

(22) Filed: Dec. 26, 2002

(65) Prior Publication Data

US 2004/0123652 A1 Jul. 1, 2004

(51) Int. Cl.
*G01M 19/00* (2006.01)

(52) U.S. Cl. .................................................... 73/118.1

(58) Field of Classification Search ................ 431/531, 431/76, 18, 22; 73/35.08, 118.1; 123/406.29, 123/406.44, 406.35, 406.24, 435, 406.26, 123/305, 406.27, 406.14, 406.12; 422/94; 219/270; 324/391, 388; 701/114
See application file for complete search history.

(56) References Cited

U.S. PATENT DOCUMENTS

| | | | | | |
|---|---|---|---|---|---|
| 4,186,701 | A | * | 2/1980 | Suzuki et al. | 123/119 A |
| 4,410,859 | A | | 10/1983 | Kuwahara | |
| 4,426,987 | A | * | 1/1984 | Latsch et al. | 123/571 |
| 4,444,172 | A | * | 4/1984 | Sellmaier et al. | 73/35.08 |
| 4,447,204 | A | * | 5/1984 | Isenberg | 431/76 |
| RE32,301 | E | * | 12/1986 | Latsch et al. | 123/440 |
| 4,648,367 | A | * | 3/1987 | Gillbrand et al. | 123/425 |
| 4,770,628 | A | * | 9/1988 | Ohkura | 431/22 |
| 4,938,019 | A | | 7/1990 | Angell et al. | |
| 5,073,753 | A | | 12/1991 | Collings et al. | |
| 5,178,001 | A | * | 1/1993 | Ikeuchi et al. | 73/117.3 |
| 5,263,851 | A | * | 11/1993 | Hosome et al. | 431/79 |
| 5,925,819 | A | * | 7/1999 | Yoshinaga et al. | 73/117.3 |
| 6,011,397 | A | * | 1/2000 | Yasuda | 324/388 |
| 6,032,650 | A | * | 3/2000 | Rask | 123/435 |
| 6,145,491 | A | * | 11/2000 | Wilstermann et al. | 123/406.35 |
| 6,202,472 | B1 | * | 3/2001 | Wezurek et al. | 73/31.05 |
| 6,425,371 | B1 | * | 7/2002 | Majima | 123/406.24 |
| 6,429,020 | B1 | * | 8/2002 | Thornton et al. | 436/153 |
| 6,505,500 | B1 | * | 1/2003 | Elgh et al. | 73/35.08 |
| 6,739,181 | B1 | * | 5/2004 | Honda | 73/35.08 |
| 6,742,499 | B1 | * | 6/2004 | Viele et al. | 123/406.14 |
| 6,887,069 | B1 | | 5/2005 | Thornton et al. | |
| 2003/0056517 | A1 | | 3/2003 | Brushwood et al. | |

* cited by examiner

*Primary Examiner*—Eric S. McCall
*Assistant Examiner*—Octavia Davis
(74) *Attorney, Agent, or Firm*—Reinhart Boerner Van Deuren P.C.

(57) ABSTRACT

An apparatus and method to sense the onset of combustion stability is presented. An electrode is positioned in a turbine combustion chamber such that the electrode is exposed to gases in the combustion chamber. A control module applies a voltage potential to the electrode and detects a combustion ionization signal and determines if there is an oscillation in the combustion ionization signal indicative of the occurrence of combustion stability or the onset of combustion instability. A second electrode held in a coplanar but spaced apart manner by an insulating member from the electrode provides a combustion ionization signal to the control module when the first electrode fails. The control module broadcasts a notice if the parameters indicate the combustion process is at the onset of combustion instability or broadcasts an alarm signal if the parameters indicate the combustion process is unstable.

28 Claims, 5 Drawing Sheets

METHOD AND APPARATUS FOR DETECTING COMBUSTION INSTABILITY IN CONTINUOUS COMBUSTION SYSTEMS

FEDERALLY SPONSORED RESEARCH OR DEVELOPMENT

This invention was made in part with Government support under CRADA No. 02N-050 between Woodward Governor Company and the National Energy Technology Laboratory of the United States Department of Energy. The Government has certain rights in this invention.

FIELD OF THE INVENTION

The present invention relates generally to continuous combustion systems, and more particularly relates to such systems operating near the onset of combustion instability.

BACKGROUND OF THE INVENTION

Continuous combustion systems such as gas turbine engines are used in a variety of industries. These industries include transportation, electric power generation, and process industries. During operation, the continuous combustion system produces energy by combusting fuels such as propane, natural gas, diesel, kerosene, or jet fuel. One of the byproducts of the combustion process is emission of pollutants into the atmosphere. The levels of pollutant emissions are regulated by government agencies. Despite significant reductions in the quantity of environmentally harmful gases emitted into the atmosphere, emission levels of gases such as $NO_x$, CO, $CO_2$ and hydrocarbon (HC) are regulated by the government to increasingly lower levels and in an ever increasing number of industries.

Industry developed various methods to reduce emission levels. One method for gaseous fueled turbines is lean premix combustion. In lean premix combustion, the ratio between fuel and air is kept low (lean) and the fuel is premixed with air before the combustion process. The temperature is then kept low enough to avoid formation of nitrous oxides (which occurs primarily at temperatures above 1850 K). The premixing also decreases the possibility of localized fuel rich areas where carbon monoxides and unburnt hydrocarbons are not fully oxidized.

One of the more difficult challenges facing manufacturers of lean premix gas turbines and other continuous combustion systems is the phenomenon of combustion instability. Combustion instability is the result of unsteady heat release of the burning fuel and can produce destructive pressure oscillations or acoustic oscillations. In lean premix gas turbines, combustion instability can occur when the air-fuel ratio is near the lean flammability limit, which is where turbine emissions are minimized and efficiency is maximized. In general, the air/fuel ratio of the premixed fuel flow should be as lean as possible to minimize combustion temperatures and reduce emissions. However, if the air/fuel ratio is too lean, the flame will become unstable and create pressure fluctuations. The typical manifestation of combustion instability is the fluctuation of combustion pressure sometimes occurring as low as +/−1 psi at frequencies ranging from a few hertz to tens of kHz. Depending on the magnitude and frequency, this oscillation can create an audible noise which is sometimes objectionable, but a much more serious effect can be catastrophic failure of turbine components due to high cycle fatigue. The most severe oscillations are those that excite the natural frequencies of the mechanical components in the combustion region, which greatly increases the magnitude of the mechanical stress.

Most continuous combustion systems are commissioned in the field with sufficient safety margin to avoid entering an operating regime where combustion instabilities can occur. However, as components wear out or fuel composition changes, the combustion process can still become unstable.

BRIEF SUMMARY OF THE INVENTION

The invention provides an apparatus and method to sense the presence of combustion instability, even at very low levels.

An ion sensor such as an electrode is positioned in the combustion chamber of a turbine combustion system at a location such that the sensor is exposed to gases in the combustion chamber. A voltage is applied to the sensor to create an electric field from the sensor to a designated ground (e.g., a chamber wall) of the combustion chamber. The voltage is applied in one embodiment such that the electric field radiates from the sensor to the designated ground of the combustion chamber. A control module detects and receives from the sensor a combustion ionization signal and determines if there is an oscillation in the combustion ionization signal indicative of the occurrence of combustion instability or the onset of combustion instability.

The control module applies a voltage to the sensor during the combustion process, measures the ion current flowing between the sensor and the designated ground of the combustion chamber, and compares the ionization current oscillation magnitude and oscillation frequency against predetermined parameters and broadcasts a signal if the oscillation magnitude and oscillation frequency are within a combustion instability range. The parameters include an oscillation frequency range and an oscillation magnitude.

The signal is broadcast to indicate combustion instability if the oscillation frequency is within a critical range for a given combustion system (e.g., the range of approximately 250 Hz to approximately 300 Hz for a critical frequency of 275 Hz) and/or the oscillation magnitude is above a first threshold relative to a steady state magnitude (e.g., ±2 psi). The signal is broadcast to indicate the onset of combustion instability if the oscillation frequency is within the critical range and/or the oscillation magnitude is above a second threshold relative to a steady state magnitude.

A redundant sensor held in a coplanar but spaced apart manner by an insulating member from the ion sensor provides a combustion ionization signal to the control module when the ion sensor fails.

These and other advantages of the invention, as well as additional inventive features, will be apparent from the description of the invention provided herein.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The present invention provides a method and apparatus to sense combustion instability and/or the onset of combustion instability in a combustion region of a continuous combustion system such as a gas turbine, industrial burner, industrial boiler, or afterburner utilizing ionization signals. The magnitude of the ionization signal is proportional to the concentration of hydrocarbons in the flame. Oscillations in the flame produce oscillations in the hydrocarbons, which in turn, results in oscillations in the ionization signal. The invention detects the frequency and magnitude of oscillations in the ionization signal and provides an indication when the frequency and magnitude of the ionization signal oscillation are above selected thresholds.

Figure 1:
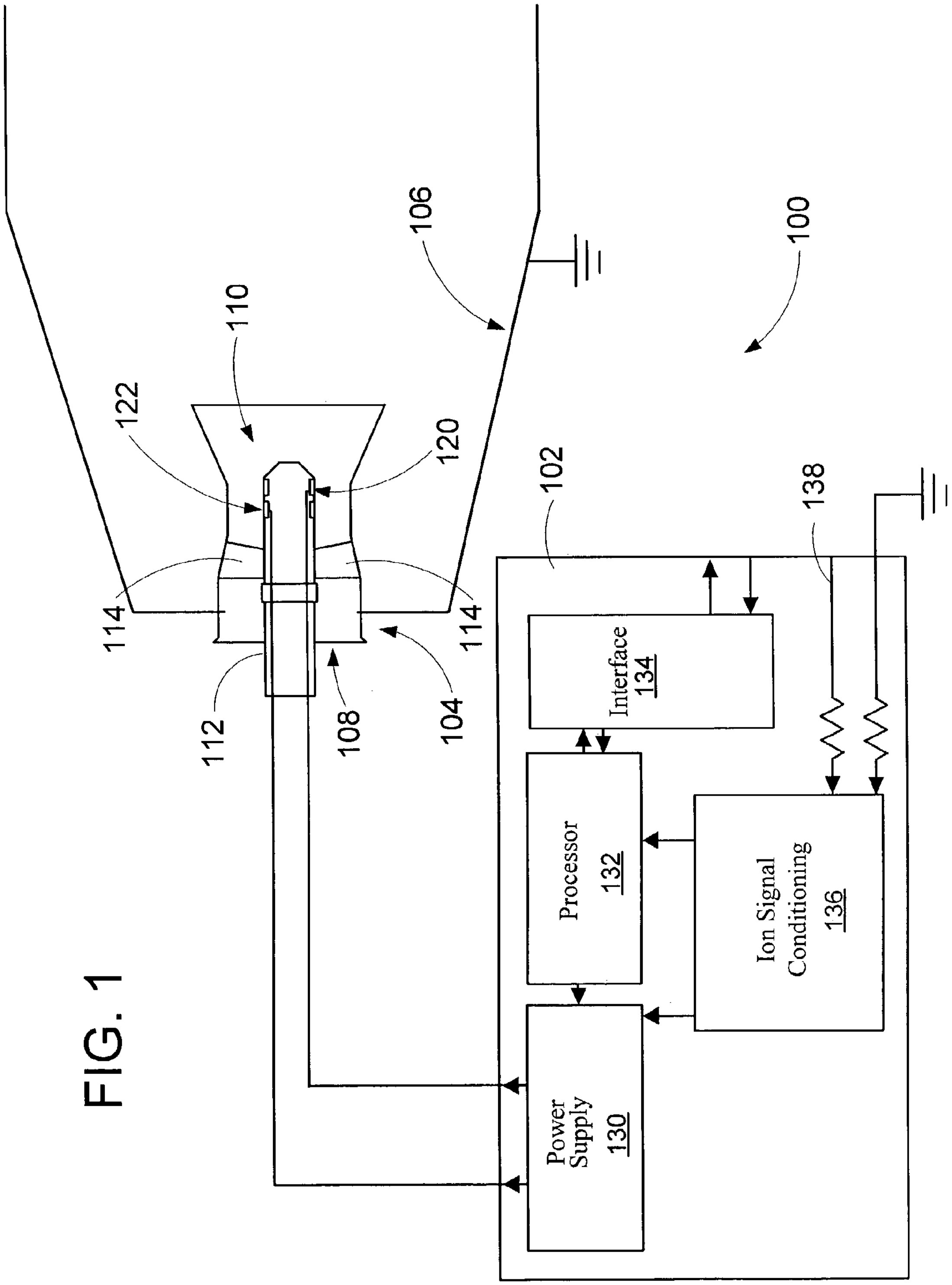
FIG. 1 is a diagram illustrating the components of the present invention in a portion of a turbine system.

Turning to the drawings, wherein like reference numerals refer to like elements, the invention is illustrated as being implemented in a suitable turbine environment. FIG. 1 illustrates an example of a suitable turbine environment 100 on which the invention may be implemented. The turbine environment 100 is only one example of a suitable turbine environment and is not intended to suggest any limitation as to the scope of use or functionality of the invention. For example, the invention may be implemented in an afterburner, industrial burner, industrial boiler, and the like. Neither should the turbine environment 100 be interpreted as having any dependency or requirement relating to any one or combination of components illustrated in the exemplary operating environment 100.

With reference to FIG. 1, an exemplary system for implementing the invention includes electronic module 102, fuel nozzle 104, and combustion chamber 106. The fuel nozzle 104 is mounted to the combustion chamber 106 using conventional means. The fuel nozzle 104 is typically made of conducting material and has an inlet section 108, an outlet port 110 that leads into combustion chamber 106 and a center body 112. An ignitor (not shown) is used to ignite the fuel mixture in the combustion region after the air and fuel are mixed in a pre-mix swirler 114. In afterburners, the air enters combustion chamber 106 through separate passages and a fuel nozzle passage is used to introduce fuel in the combustion chamber 106. The operation of the turbine is well known and need not be discussed herein.

The electronic module 102 may be a separate module, part of an ignition control module or part of an engine control module. The electronic module 102 includes a power supply 130 for providing a controlled ac or dc voltage signal to the electrodes 120, 122 when commanded by processor 132. Processor 132 commands the power supply to provide power to the electrodes 120, 122, receives ion current signals from electrodes 120, 122 via conditioning module 136, performs computational tasks required to analyze the ion signals to determine the onset of combustion instability and combustion instability, and communicates with other modules such as an engine control module through interface 134. Conditioning module 136 receives signals from the electrodes 120, 122 via lines 138 and performs any required filtering or amplification.

Figure 2A:
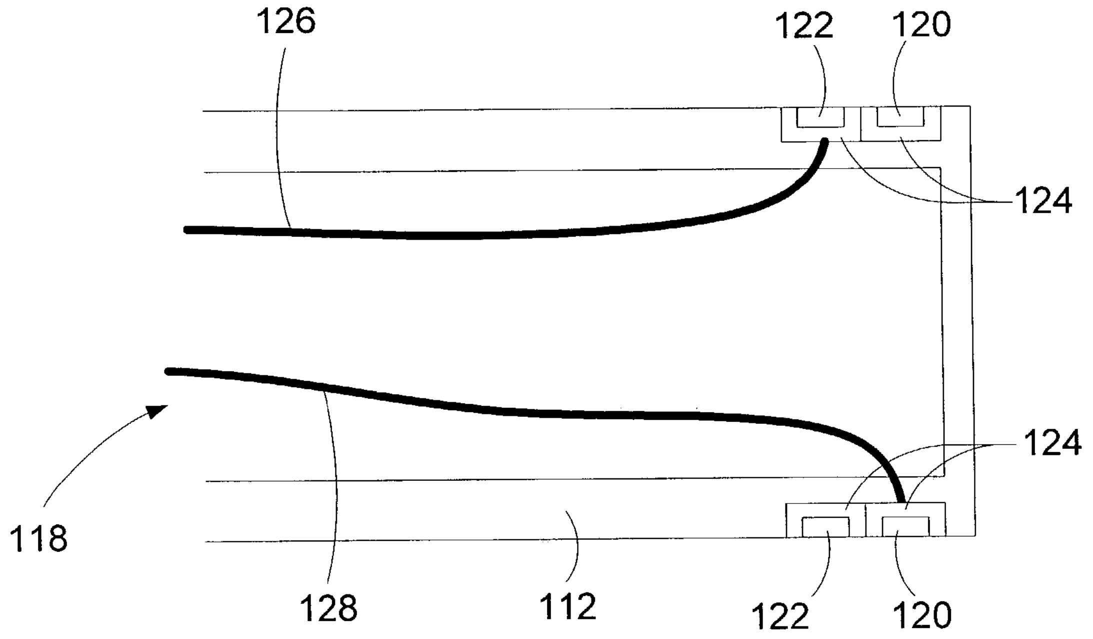
FIG. 2*a* is a cross-sectional view of the electrode component of one embodiment of the present invention integrated into a fuel nozzle body.

Turning now to FIG. 2*a,* an embodiment 118 of the ion sensor of the present invention includes circular combustion electrode 120, redundant electrode 122, and insulating members 124. The electrodes 120 and 122 are made of an electrically conducting material, such as a metal that is capable of withstanding the normal operating temperatures produced in a combustion system. The material should also be able to withstand the high temperatures presented during abnormal conditions such as a flashback condition.

Figure 2B:
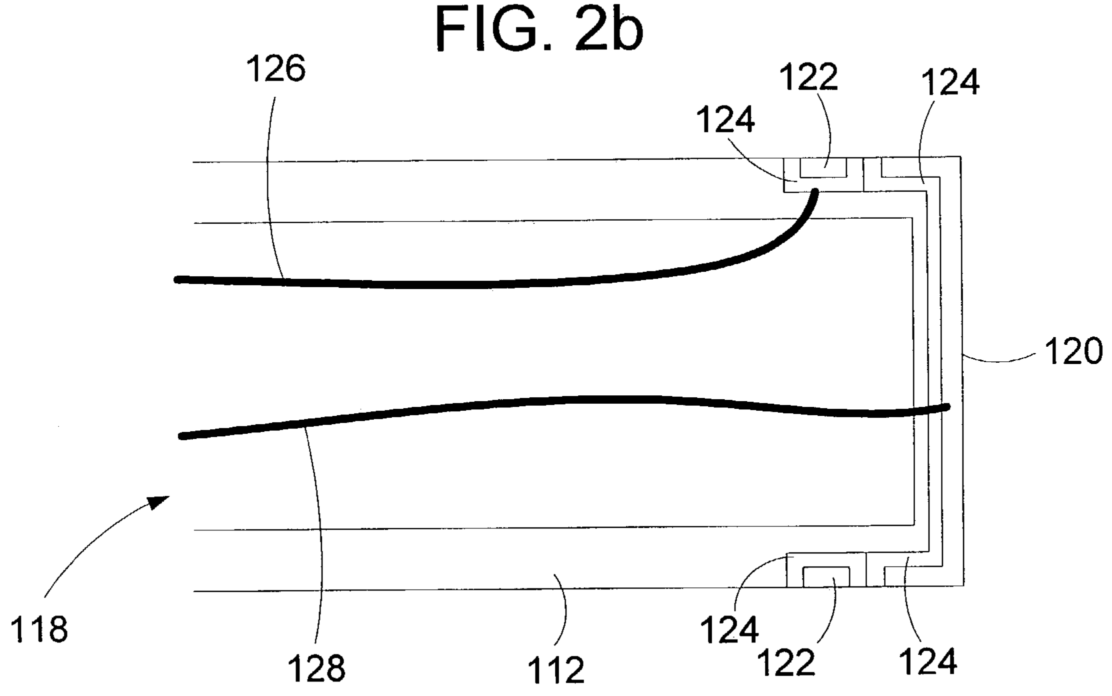
FIG. 2*b* is a cross-sectional view of an alternate embodiment of the electrode component of the present invention integrated into a fuel nozzle body

The insulating member 124 is made of a non-conducting, rugged material, such as an insulated ceramic oxide material, that is able to withstand both the normal operating temperatures produced during fuel combustion as well as the high temperatures presented during a flashback condition. The insulating member 124 has a circular shape with a smooth surface. The electrodes 120, 122 are securely seated between the insulating member 124 in electrical and physical isolation from one another, but in such manner that a significant portion of the face of each electrode 120, 122 is exposed such that the electrodes 120, 122 can detect the ionization flame field surrounding the combustion in order to determine combustion instability. The electrodes 120, 122 are electrically charged by coaxial cables 126, 128. Alternatively, the insulating member 124 may be an integral part of the center body 112 or located at other points of the fuel nozzle 104. FIG. 2*b* shows an alternate embodiment of the electrodes 120, 122 where the surface area of electrode 120 is maximized by using the entire tip of the center body 112. Further details of the construction of electrodes 120, 122 are described in U.S. Pat. No. 6,429,020 and U.S. patent application Ser. No. 09/955,582 filed on Sep. 18, 2001, hereby incorporated by reference in their entireties.

It should be noted that other types of ion current sensors may be used in accordance with the present invention. For example, a single electrode may be used. Additionally, other types of electrodes may be used that are capable of sensing ion current in continuous combustion systems. In the description that follows, the electrodes 120,122 shall be used to describe the operation of the invention.

Figure 3:
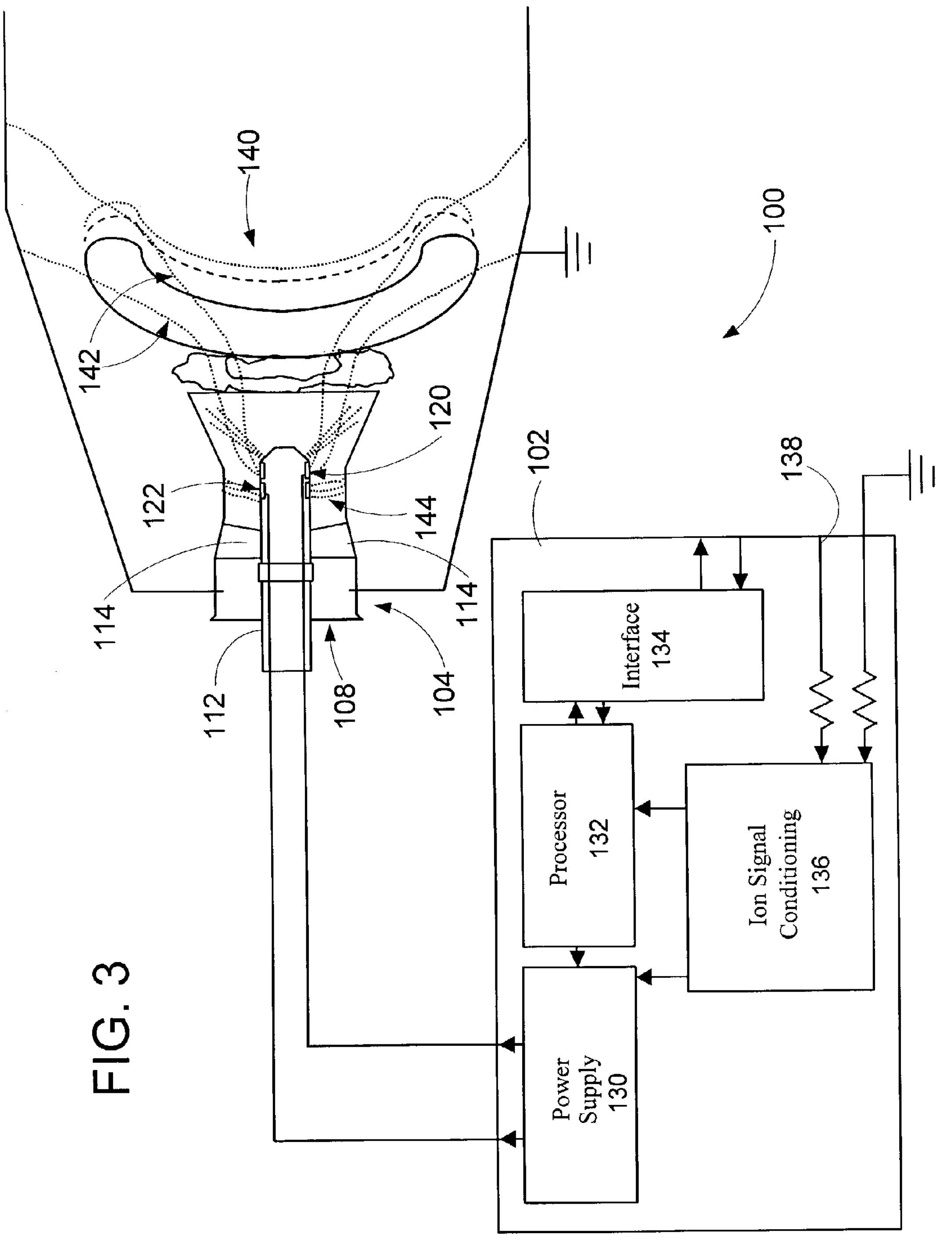
FIG. 3 is a diagram illustrating the components of FIG. 1 in a system having combustion instability.

Turning now to FIG. 3, during normal combustion, the flame 140 produces free ions and the electrode 120 will have an ion current flow when a voltage is applied to the electrode 120. Ion current will flow between the electrode 120 and ground (e.g., the chamber wall). The magnitude of the ion current flow will be in proportion to the concentration of free ions in the combustion process. When a voltage potential is applied to electrode 120, 122, an electric field 142 (144) is established between the electrode 120 and the remaining components in the combustion chamber. The purpose of the electrode 122 is to serve as a redundant sensor. During normal operation, the electric field 144 in electrode 122 points rearward toward the swirler 114 due to the canceling effect of the electric field 142 produced by electrode 120. In the event that electrode 120 or the corresponding circuitry for electrode 120 fails, electrode 122 may be used and it will sense substantially the same ion current of electrode 120 because there is no cancellation of electric fields by electrode 120. For combustion chambers having walls that are electrically insulated or are poorly grounded, a grounding strip is used to provide a return path to enhance the flow of ion current. The term grounding strip as used herein means any connection that provides a return path to ground. For example, the grounding strip may be a ground plane, a conductive strap, a conductive strip, a terminal strip, etc. It should be noted that the electrodes 120, 122 may also be used as a guard electrode and flashback sensor as described in U.S. Pat. No. 6,429,020 and U.S. patent application Ser. No. 09/955,582.

Figure 4:
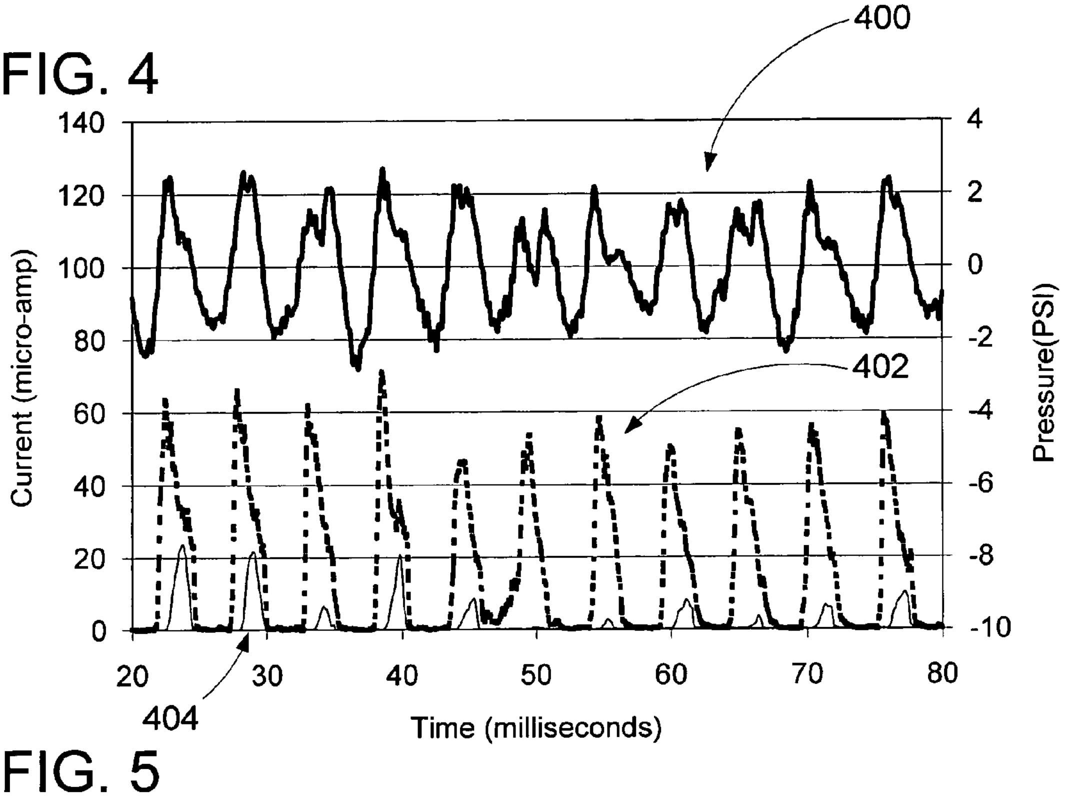
FIG. 4 is a graphical illustration of the output of a pressure sensor and ion current illustrating that ion current oscillations correspond to pressure oscillations in a combustion chamber.
Figure 5:
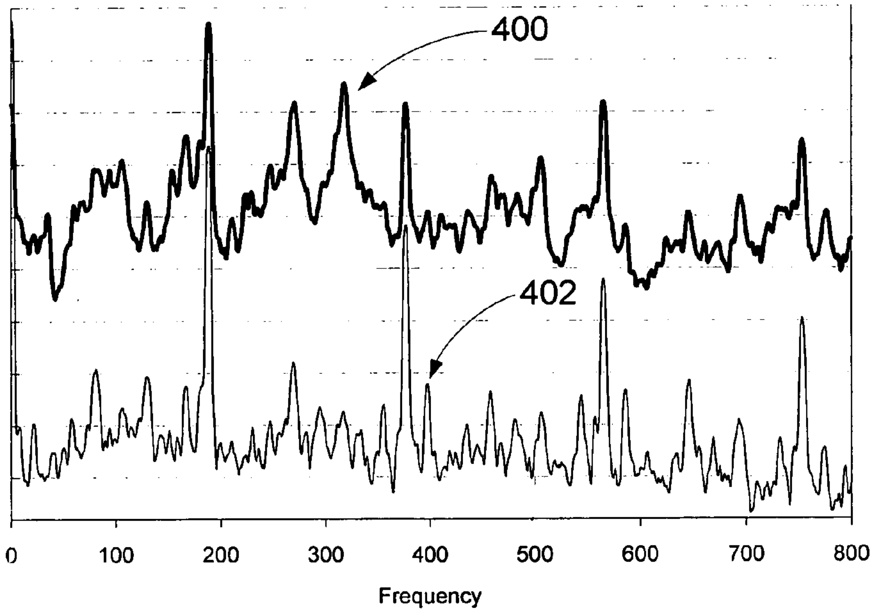
FIG. 5 is a diagram illustrating that the dominant frequencies of ion current oscillations track surges in pressure oscillations in a combustion chamber.

Once the flame 140 begins to oscillate, the ionization field surrounding the flame will also oscillate. The electronic module 102 senses the oscillation and takes appropriate action if the oscillation magnitude and frequency are above threshold levels as described below. Turning now to FIG. 4, the oscillations in pressure and in ion current are shown. In FIG. 4, curve 400 illustrates a pressure oscillation from a pressure sensor mounted in a combustion chamber having the electrodes 120, 122. Curve 402 is the ion current flowing through electrode 120 and curve 404 is the ion current flowing through electrode 122. In the event that electrode 120 fails, the ion current flowing through electrode 122 will be similar to curve 402. It can be seen that the ion current can provide a direct indication of pressure oscillations in the combustion chamber. FIG. 5, which is a fast Fourier transformation (FFT) of FIG. 4, illustrates that the dominant frequencies of the ion current 402 track the dominant frequencies of pressure 400 over various operating conditions in the combustion chamber 106.

When the flame 140 becomes unstable, it will typically exhibit pressure oscillations ranging in frequency from a few Hz to 2000 Hz and higher. Oscillations with amplitudes as low as ±1 psi are capable of producing audible noise that cannot be tolerated in some cases. In addition to noise, the pressure oscillation waves can create mechanical stress in the system, leading to premature failure and even catastrophic failure. The combustion chamber liner and turbine blades (not shown) are most susceptible to high fatigue stress caused by combustion oscillations.

Figure 6:
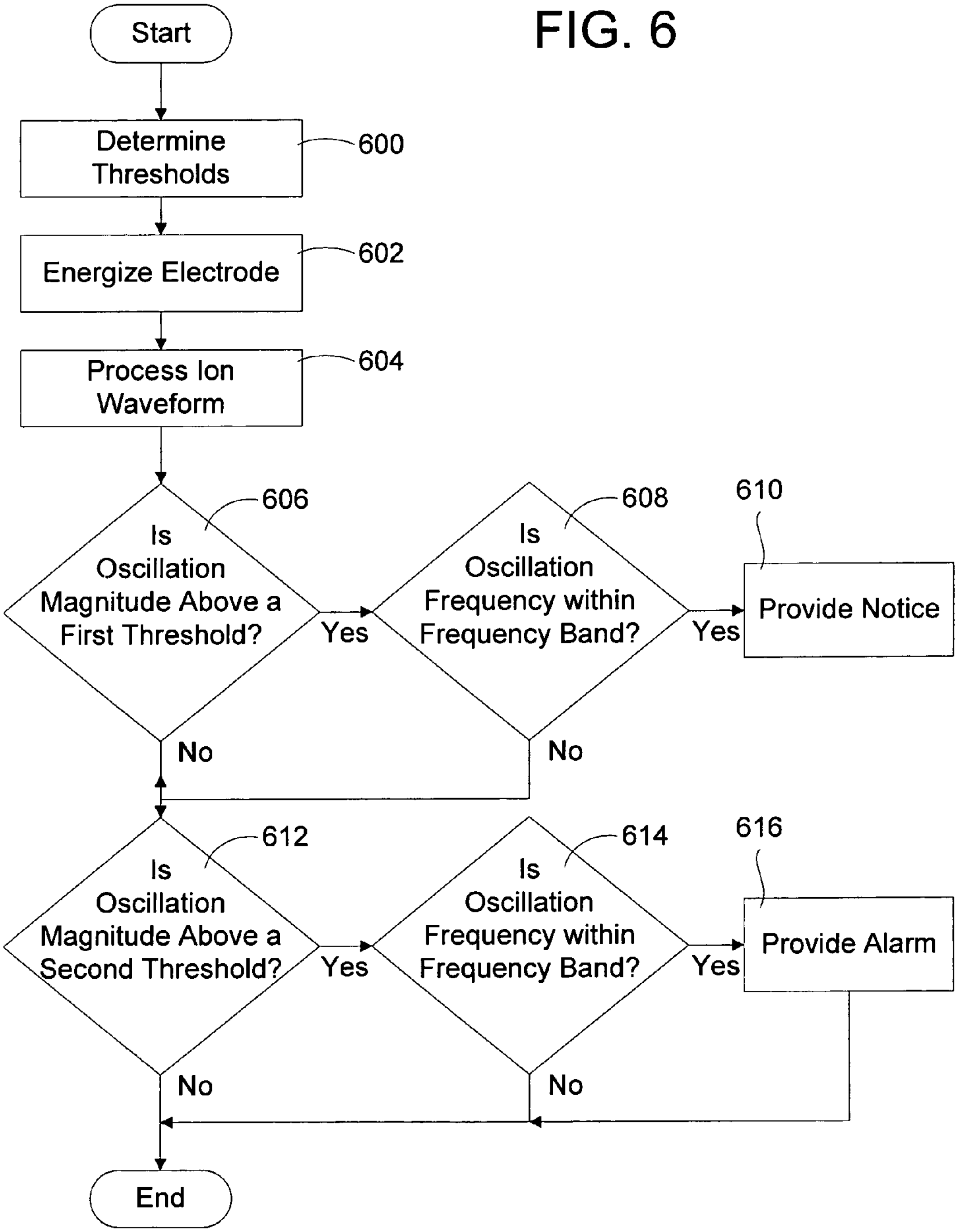
FIG. 6 is a flowchart illustrating the steps to detect the onset of combustion instability.

Turning now to FIG. 6, the steps the electronic module performs in detecting the onset of combustion instability are illustrated. Setpoints (i.e., thresholds) are determined by an operator and are stored in an engine control module or other control module such as an ignition control module and received by the electronic module (step 600). The setpoints include oscillation magnitude and frequency thresholds that the control module is to detect. For example, the thresholds could be for the onset of combustion instability, a shut down level (e.g., destructive combustion instability), etc. For purposes of explanation, two thresholds will be used. Those skilled in the art recognize that any number of thresholds may be used. The thresholds used for explanation are a first threshold and a second threshold. The first threshold is for the onset of combustion instability where the oscillation frequency and magnitude are in a region where control parameters can be changed to move the combustion system operation away from the unstable range. The second threshold is for conditions where emergency actions must be performed such as reducing the power or shutdown the system to protect the system because further operation can lead to serious mechanical failure.

The electrode 120 is energized at the appropriate point in the cycle (step 602). Typically, the electrode 120 is energized after (or when) the fuel/air mixture is ignited. Electronic module 102 receives the ion waveform and processes the waveform (step 604). The waveform processing includes detecting if there is any oscillation in the waveform. If there is oscillation, the magnitude and frequency of oscillation is determined. If the oscillation magnitude is above the first threshold and below the second threshold (step 606), the frequency is checked to determine if it is within the frequency band setpoint for the first threshold (step 608). If the oscillation frequency is within the frequency band, a notice is sent to the engine control module so that control parameters can be changed such that the turbine operates further away from the point of combustion instability (step 610).

If the oscillation exists, the module 102 determines if the oscillation magnitude is above the second threshold level (step 612). If the oscillation magnitude is above the second threshold, the module determines if the frequency is within the frequency band setpoint for the second threshold (step 614). If the oscillation frequency is within the frequency band, an alarm is sent so that appropriate action can be taken such as shutting down the combustion system or derating the system output to avoid damage to the combustion system (step 616). In some continuous combustion systems, the notice and/or alarm is sent if the magnitude is above the threshold or the frequency is within the frequency band.

It can therefore be seen that a method and apparatus to detect combustion instability has been described. The need for a pressure sensor to sense combustion instability is eliminated using the present invention. Life-time maintenance costs of the turbine system is reduced with the elimination of the pressure sensor. The control components may be separately housed or be integrated into existing turbine control modules.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for detecting combustion instability in a continuous combustion system having a combustion region comprising:

at least one ion sensor positioned at a location such that the at least one ion sensor is exposed to gases in the combustion region of the continuous combustion system; and a controller coupled to the at least one ion sensor, the controller adapted to receive from the at least one ion sensor a combustion ionization signal and detect an oscillation in the combustion ionization signal indicative of the occurrence of combustion instability.

2. The system of claim 1 further comprising a power source connected to the at least one ion sensor and controlled by the controller.

3. The system of claim 1 wherein the continuous combustion system is a gas turbine combustion system and wherein the at least one ion sensor is positioned in the fuel nozzle of the gas turbine combustion system.

4. The system of claim 1 wherein the at least one ion sensor comprises at least one electrode.

5. The system of claim 4 wherein the at least one electrode comprises a first electrode and a second electrode, the first electrode and the second electrode being held in a coplanar but spaced apart manner by an insulating member.

6. The system of claim 4 wherein the at least one electrode is excited such that an electric field radiates from the at least one electrode to a ground in the combustion region.

7. A system for detecting combustion instability in a gas turbine combustion system having a combustion region comprising:

at least one electrode positioned in the combustion region at a location such that the at least one electrode is exposed to gases in the combustion region of the gas turbine combustion system; and a control module coupled to the at least one electrode, the control module adapted to excite the at least one electrode to create an electric field from the at least one electrode to a ground of the combustion region and receive from the at least one electrode a combustion ionization signal, the control module adapted to detect an oscillation in the combustion ionization signal indicative of the occurrence of combustion instability.

8. The system of claim 7 wherein the combustion system is a gas turbine combustion system and wherein the at least one electrode is positioned in the fuel nozzle of the gas turbine combustion system.

9. The system of claim 7 wherein the at least one electrode comprises a first electrode and a second electrode, the first electrode and the second electrode being held in a coplanar but spaced apart manner by an insulating member, the second electrode providing a redundant combustion ionization signal to the control module when excited by the control module.

10. The system of claim 7 wherein the control module compares a magnitude of the oscillation in the combustion ionization signal to a threshold level and sends a signal to an engine controller if the magnitude is at or above the threshold level.

11. The system of claim 7 wherein the control module excites the at least one electrode such that the electric field radiates from the at least one electrode to the ground of the combustion region.

12. A method for detecting combustion instability in a continuous combustion system having an electrode positioned at a location such that the electrode is exposed to combustion in a combustion region of the continuous combustion system, the method comprising the steps of:

receiving an ion current signal from the electrode indicative of ion current flowing through the electrode positioned at the location such that the electrode is exposed to combustion in the combustion region of the continuous combustion system; and determining if parameters of the ion current signal indicate the combustion process is one of at the onset of combustion instability or is unstable.

13. The method of claim 12 further comprising the step of applying a voltage to the electrode during the combustion process.

14. The method of claim 12 further comprising the step of broadcasting a signal if the parameters of the ion current signal indicate the combustion process is one of at the onset of combustion instability or is unstable.

15. The method of claim 12 wherein the continuous combustion system comprises a lean premix gas turbine.

16. The method of claim 12 wherein the parameters include at least one of an oscillation frequency and an oscillation magnitude.

17. The method of claim 16 further comprising the step of broadcasting a signal to indicate the onset of combustion instability if the oscillation frequency is within a predetermined frequency range and the oscillation magnitude is above a first threshold.

18. The method of claim 17 wherein the first threshold corresponds to ±1 psi.

19. The method of claim 17 wherein the predetermined frequency range is approximately ±50 Hz from a critical frequency of the continuous combustion system.

20. The method of claim 16 further comprising the step of broadcasting a signal to indicate combustion instability if the oscillation frequency is within the predetermined range and the oscillation magnitude is at least a second threshold.

21. The method of claim 12 further comprising the step of sending a signal to an engine controller if the parameters of the ion current signal indicate the combustion process is one of at the onset of combustion instability or is unstable.

22. A computer-readable medium having computer-executable instructions for detecting combustion instability in a continuous combustion system having an ion sensor positioned at a location such that the electrode in the ion sensor is exposed to combustion in the combustion region of the combustion system, the computer-executable instructions performing the steps comprising:

determining parameters of ion current flowing through the ion sensor positioned at the location such that the electrode in the ion sensor is exposed to combustion in the combustion region of the combustion system; and providing an alert if the parameters indicate the combustion process is one of at the onset of combustion instability or is unstable.

23. The computer readable medium of claim 22 having further computer executable instructions for performing the step of applying a voltage to the ion sensor during the combustion process.

24. The computer readable medium of claim 22 wherein the parameters include an oscillation frequency and an oscillation magnitude and wherein the step of providing the alert comprises the step of sending a signal to an engine controller to indicate the onset of combustion instability if the oscillation frequency is within a predetermined frequency range and the oscillation magnitude is above a first threshold.

25. The computer readable medium of claim 22 wherein the first threshold corresponds to ±1 psi.

26. The computer readable medium of claim 22 wherein the predetermined frequency range is approximately ±50 Hz from a critical frequency of the continuous combustion system.

27. The computer readable medium of claim 22 wherein the predetermined frequency range is between approximately 10 Hz and approximately 10 kHz.

28. The computer readable medium of claim 22 wherein the parameters include an oscillation frequency and an oscillation magnitude and wherein the step of providing the alert comprises the step of sending a signal to an engine controller to indicate combustion instability if the oscillation frequency is within a predetermined frequency range and the oscillation magnitude is above a second threshold.

* * * * *